United States Patent [19]

Best

[11] 4,141,747
[45] Feb. 27, 1979

[54] LARGE GRANULE STARCH PROTECTIVE MATERIAL FOR PRESSURE SENSITIVE MICROENCAPSULATED COATINGS

[75] Inventor: Roland W. Best, Decatur, Ill.

[73] Assignee: General Mills Chemicals, Inc., Minneapolis, Minn.

[21] Appl. No.: 822,013

[22] Filed: Aug. 4, 1977

[51] Int. Cl.² .......................... C08L 3/02; C13L 1/08
[52] U.S. Cl. .................................. 106/210; 106/213; 127/32
[58] Field of Search .......................... 106/210; 127/32; 209/211

[56] References Cited

U.S. PATENT DOCUMENTS

| | | | |
|---|---|---|---|
| 2,642,185 | 6/1953 | Fontein | 209/211 |
| 2,756,878 | 7/1956 | Herkenhoff | 209/211 |
| 3,876,629 | 4/1975 | Lotzgelsell | 536/106 |
| 3,901,725 | 8/1975 | Bond et al. | 127/32 |
| 3,951,948 | 4/1976 | Bond et al. | 260/9 |
| 3,996,061 | 12/1976 | Johnson | 127/32 |

Primary Examiner—Theodore Morris
Attorney, Agent, or Firm—Patrick J. Span; Elizabeth Tweedy; Forrest L. Collins

[57] ABSTRACT

A large granule starch protective material for pressure sensitive microencapsulated coatings, particularly carbonless copy duplicating paper. A previously dried cereal starch selected from the group consisting of wheat, barley and rye is subjected to wet process separation to obtain a large granule starch from the starching starch, which has a characteristic particle size distribution including smaller granules ranging in size from 2 microns to about 16 microns, and a second group of larger granules, mostly ranging in size from 16 microns to about 35 microns.

9 Claims, 1 Drawing Figure

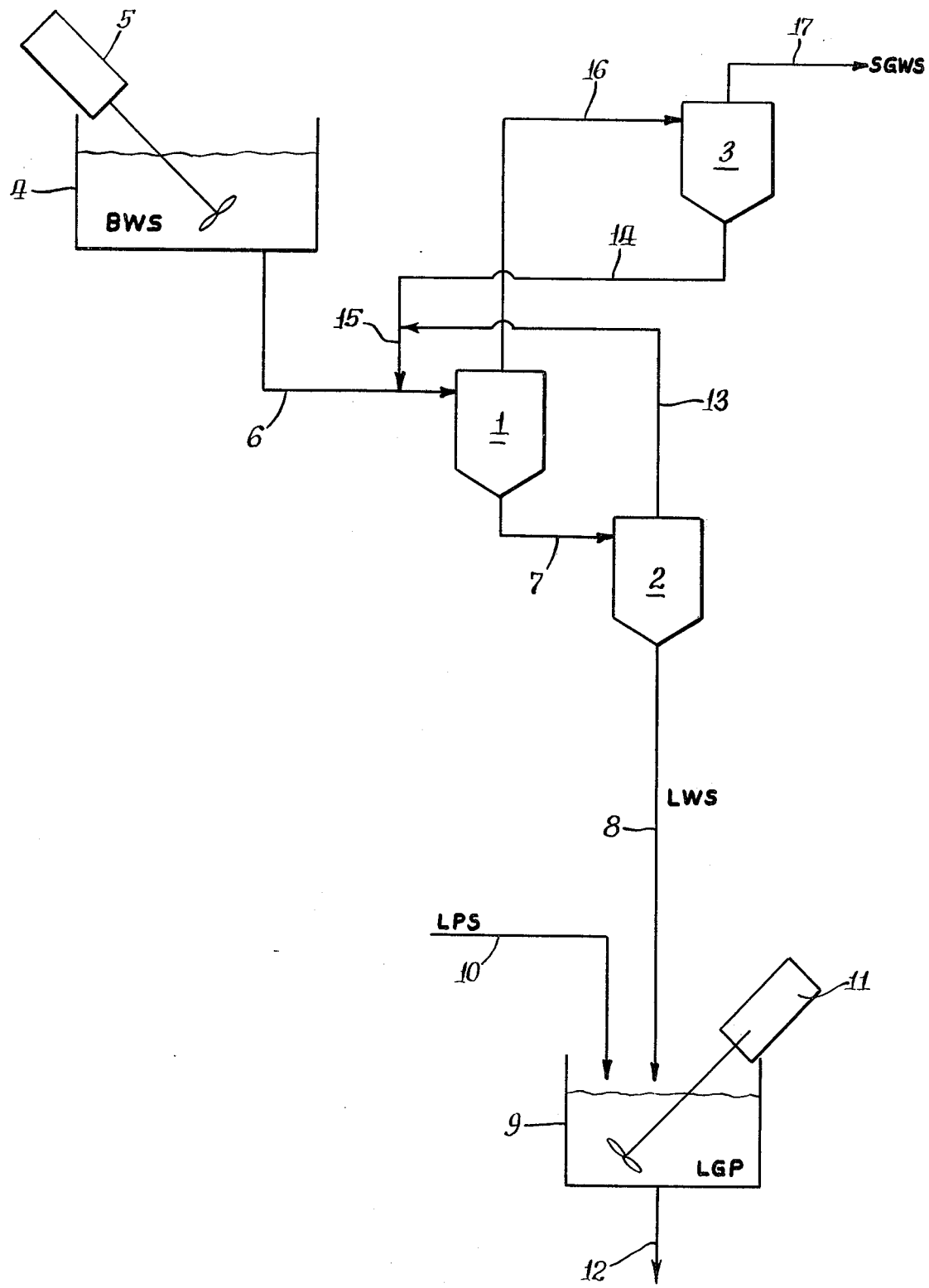

LARGE GRANULE STARCH PROTECTIVE MATERIAL FOR PRESSURE SENSITIVE MICROENCAPSULATED COATINGS

An improved yield of large granule starch is made possible by the method of the invention which includes partially separating the large granule portion of a wheat starch using a primary hydrocyclone, and second and third hydrocyclones which supply recirculation streams to the feed stream to the first hydrocyclone. The underflow from the second hydrocyclone is a high yield, large granule starch product stream, and the overflow is a recirculation stream which is fed back to the primary hydrocyclone feed stream. The overflow from the primary hydrocyclone is directed into a third hydrocyclone. The underflow from the third hydrocyclone is also fed back as a recirculation stream to the primary hydrocyclone feed stream, and the overflow from the third hydrocyclone is led away as a small granule byproduct, which may be subjected to further processing, or may be dried and sold as a small granule product. It has been found that the best balance of the system, and the highest yield of large granule product is obtained when the particle size distribution of the recirculation feed streams matches, or nearly matches, the particle size distribution of the feed stream.

The large granule cereal starch product collected from the underflow of the second hydrocyclone may be further upgraded in average particle size by blending a minor amount of a large granule starch therewith. Refined pea starch, sago starch, arrowroot starch, horse bean starch, or other starch having an average particle size in the range of 20-40 microns, preferably 20-35 microns, may be blended with large granule cereal starch product for this purpose. The above recirculation system improves the percentage yield of useful protective starch material derived from prime grade, wheat, barley or rye starch by as much as 15-25%.

BACKGROUND OF THE INVENTION AND PRIOR ART

Carbonless copy paper is coated with ink containing microcapsules which respond to a sharp impact from a typewriter or other writing instrument to produce a duplicate image on a copy sheet disposed under the top sheet. The ink microcapsules of the coating are protected from premature smudging or rupture by means of starch particles included in the paper coating interspersed with the ink microcapsules. The starch particles do not crush under the normal paper handling procedures to prevent premature rupture of the microcapsules, but do not prevent imaging due to typewriter impact pressure or from a writing instrument. British patent specification No. 1,252,858 published Nov. 10, 1971, and British Pat. No. 1,232,347 published May 19, 1971 describe ink microcapsule/protective starch material coatings of this general type. These references rate arrowroot starch particles as the most functional of the various starch particles tested.

U.S. Pat. Nos. 3,876,629, 3,901,725 and 3,951,948 are directed to special large granule starch particles which are obtained from a bimodal cereal starch such as wheat, barley or rye by the processes described. These special large granule starches replace the more expensive and scarce arrowroot starch.

U.S. Pat. Nos. 3,996,060 and 3,996,061 are directed to a protective material which comprises refined, large granule starch derived from legume starches from which non-starch materials have been removed.

Although the first series of patents mentioned describe a method of wet separation of the large granule portion of starch particles from a prime grade, bimodal wheat starch, the yield of large granule starch product useful for carbonless copy paper coatings was about 15-20% of the total weight of the prime grade wheat starch supplied to the separation equipment. The by-product streams from the separation process described could only be sold in competition with ordinary starch, and therefore, at much lower prices than the large granule product used in the carbonless copy paper coatings.

The second series of patents mentioned above describe legume starch particles which are presently obtained in an unrefined form from Canada, and then treated to remove non-starch material including protein and fiber. The legume starches include faba bean starch and yellow field pea starch, which may have a particle size distribution in the range of 25-50 microns and 20-40 microns, respectively. The refined legume starch particles have proven to be very satisfactory protective particles in carbonless copy paper coatings, and they are more readily available then arrowroot.

The need for improving the yield of usable protective material derived from wheat starch becomes evident when the selling price of the by-product small granule portion is compared to the much greater value of the large granule protective material which is used in carbonless copy paper coatings. Several other important economic considerations are the termination of the Federal government incentive program for developing industrial uses for wheat starch, coupled with the much more stringent effluent limitations now being established at most starch milling locations. Faced with these serious additional cost burdens, it became necessary to discover how to use different starting materials, and to improve the yield of useful protective starch particles in proportion to by-product. Several approaches were tried without success. One attempted approach was to chemically increase the size of the substandard size starch particles, to thereby increase the yield. Several recirculation systems were also tried, without significant success, until the recirculation system of the subject invention was conceived and tried. It has proved to be effective on a commercial scale to increase the yield of usable protective starch particles from about 15-20% by weight of feed stream up to more than 40% by weight of the feed stream.

SUMMARY OF THE INVENTION

This invention is directed to an improved method of obtaining a large granule starch material having a weight average particle size in the range of 20 microns, or larger. The bulk of the large granule starch material is obtained from a prime grade wheat starch which normally has a typical granule size distribution with about 20-22% by weight of the granules ranging in size from 20-32 microns and about 50-55% by weight of the granules ranging in size from 16-32 microns, and about 45-50% are 2-16 microns.

The process employs a wet separation system in which the slurried starch is passed through a plurality of hydrocyclones which are connected to recirculate certain by-product streams back into the system as a part of the feed stream to increase the yield of large granule starch product by about 15-25%. For every 100 parts by weight of feed starch, the yield of useful product which can be obtained by the process of the invention is 40 parts, or better.

An important feature of the process is the careful balancing of the recirculation feed streams so that the proportion of large granules and small granules substantially matches the proportion of such granules found in the feed stream. The system is most effective when the feed stream is kept in careful balance by careful control of the recirculation feed streams.

The subject invention provides an improved method to obtain the best possible yield of a particular average granule size from a starch feed stream having a plurality of possible particle size fractions. A primary hydrocyclone supplies a second and third hydrocyclone. One stream is recirculated from each of the second and third hydrocyclones and they are added to the feed starch slurry which is supplied to the first hydrocyclone. The particle size distribution of the recirculated streams should substantially match, or nearly match, the input starch feed stream particle size distribution. If the recirculated streams fall below the particle size distribution of the feed stream, the product particle size distribution gradually drops below specification. If the recirculated streams are higher than the feed stream in particle size distribution, the system requires adjustment to remove more large granules on the first and second pass underflows. Otherwise, the particle size distribution of the product will vary considerably, with some collected product exceeding product specification, which represents an economic loss, since less product is produced for a given amount of feed stream starch. The above process can improve the yield of product fraction by as much as 15 to 25%.

The resulting product may be further improved by adding and blending a predetermined amount of another starch with it, which starch has a different particle size distribution to charge the particle size distribution of the final product in the direction of the particle size distribution of the added starch. For example, when the average particle size of a large granule wheat starch fraction is slightly lower than desired, it may be increased by blending a predetermined amount of refined, large granule pea starch, arrowroot starch, or specially fractionated potato starch having a higher particle size distribution than the fractionated wheat starch to obtain the desired increase in overall particle size of the blended, large granule product.

BRIEF DESCRIPTION OF THE DRAWINGS

The drawing is a generally schematic illustration of the overall process of the invention. The various parts of the apparatus are merely indicated by symbols, since it is the particular arrangement of the parts and the overall cooperative function of the parts of the system which results in the improved process of the invention.

DETAILED DESCRIPTION OF THE INVENTION

As shown in the drawing, the system in its more rudimentary form includes hydrocyclones 1, 2 and 3 and the related equipment described below, first following the main process streams through the system, and then following the recirculating streams. Prime grade wheat starch (BWS) is first slurried in water and thoroughly agitated in tank 4 by stirring means 5. The aqueous slurry of BWS is then supplied through feed stream line 6 to the first hydrocyclone 1 where it is separated by hydrocyclone, vortical flow into an overflow stream, and an underflow stream. The latter stream is rich in larger granules, and leaves hydrocyclone 1 through first pass underflow line 7, and enters hydrocyclone 2 as a feed stream to undergo a second separation into an overflow stream 13 and an underflow stream 8. The underflow stream 8 leaves the hydrocyclone 2 through product line 8 as large granule wheat starch (LWS), and is carried to a collecting tank 9. A supply line 10 also empties a large granule pea starch (LPS) into tank 9 as desired, where LPS starch is blended by stirring means 11 to produce a further upgraded large granule product (LGP). The LGP starch product is then removed through product line 12 for dewatering and drying by well-known methods to prepare the LGP starch product for shipment.

The overflow stream 13 of the hydrocyclone 2 still contains some recoverable large granules. This overflow stream 13 also contains smaller granules, and it matches the feed stream 6 in particle size distribution. Overflow stream 13 is recirculated back to feed stream 6 along with a second recirculation stream 14, which is the underflow from hydrocyclone 3. The first and second recirculation lines 13 and 14 are shown joined to form a main recirculation line 15, which supplies the blended first and second recirculation streams to the feed stream line 6 to augment the feed stream to hydrocyclone 1. However, recirculation lines 13 and 14 can each empty directly into the tank 4 if the recirculation streams are substantially the same in particle size distribution as the feed stream 6, thereby omitting main recirculation line 15. The underflow recirculation stream through line 14 from the hydrocyclone 3 and the overflow recirculation stream through line 13 from hydrocyclone 2, are balanced so that two recirculation streams are provided which have substantially the same bimodal particle size distribution as the BWS feed stream supplied from tank 4 through feed stream line 6.

The lines 13 and 14 are preferably arranged to supply two recirculation streams directly into the tank 4 when the particle size distribution of the recirculating streams is nearly the same as the particle size distribution of the feed starch slurry in tank 4. Recirculation feed streams 13 and 14 are monitored during operation to insure that they have the same particle size distribution as the feed stream. The system can be adjusted by controlling the flow rate through hydrocyclones 2 and 3. If necessary, the various streams can be collected for recirculation through the system at a later time after the particle size distribution of the recirculation feed streams 13 and 14 again matches the particle size distribution of the original feed stream. If the recirculated feed streams 13 and 14 have an average particle size which is lower than the main feed stream, the resulting product has a tendency to shift to a lower average particle size, thereby decreasing the quality of the product obtained.

The underflow stream is recirculated as described above, and the overflow stream from hydrocyclone 3 is removed through overflow line 17. This overflow stream is a small granule wheat starch (SGWS) by-product, and may be further modified, treated or used in any of the ways that wheat starch is used. Dewatering and drying of the SGWS by-product can be accomplished by any of the means well-known in the art.

The system described above has been found to achieve a good balance at improved recovery levels when 58 parts by weight dry basis of BWS starch, 25 parts by weight dry basis of recirculation overflow from hydrocyclone 2 through line 13, and 17 parts by weight of recirculation underflow from the hydrocyclone 3 are combined to make up 100 parts by weight of feed stream to hydrocyclone 1. Hydrocyclone 1 evenly divides the feed stream into 50 parts by weight overflow and 50 parts by weight underflow.

The 50 parts by weight underflow is then further evenly split in hydrocyclone 2 into 25 parts by weight overflow and 25 parts by weight underflow. The 25 parts overflow has the same particle size distribution as the feed stream, and is recirculated to augment the feed stream fed to hydrocyclone 1. The 25 parts by weight underflow becomes the LWS starch product. The yield in this particular example is 25/58, or about 43% of the input feed stream. This is believed to represent a substantial improvement in the theoretically possible total recovery of usable large granule starch from the BWS starch feed stream.

The particular BWS feed stream may vary in large starch particle content, depending on its previous milling history. Some dewatering and centrifuging procedures, and the overall starch milling process may result in a larger overall percentage of small granule wheat starch (SGWS). The hydrocyclones 1, 2 and 3 of the system should accordingly be balanced so that the recirculation feed streams have substantially the same particle size distribution as the primary feed stream 6. In such a procedure, it may be desirable to include a main recirculation line 15 of a configuration to accomplish blending of the recirculation streams 13 and 14.

The solids levels through the system vary generally in the ranges set forth below. The feed stream 6 should generally have a Baumé in the range of 7°–15° Bé, and when it moves outside this range to higher solids, additional water can be added at tank 4, or other internal adjustment in the system can be made so that the solids level of the feed stream 6 decreases. If the solids level of the feed stream 6 drops below the desired range, flow through hydrocyclone 3 can be adjusted by restricting underflow 7 of hydrocyclone 1, and increasing flow through hydrocyclone 3 so recirculation stream 14 increases and raises the Baumé of feed stream 6 to bring the system back in balance.

The continuing adjustment of the solids level and flow rate of of the starch slurry streams which are processed is important to the success of the method of the invention. The initial feed stream slurry of prime grade, unmodified wheat starch (BWS) is stirred in the tank 4 until well dispersed. The solids is adjusted to about 16° Bé.

The solids level of recirculation stream 13 is normally in the range of 3°–5° Bé, which is below that of the feed stream 6. LWS starch product stream 8 normally has a Baumé of 18°–22° Bé, which is comparable to the range of 16°–22° Bé of the first hydrocyclone underflow stream 7 and the same as the third hydrocyclone (underflow) recirculation stream 14, which is also 18°–22° Bé.

The above solids levels have been found to give an efficient operation to produce a LWS starch product 8 of the greatest possible yield, which, when blended with a minor amount of LPS starch or other larger granule starch, will meet the product specifications set forth herein.

Hydrocyclones 1, 2 and 3 are Doxie "P" Type Eliminators, manufactured by Dorr-Oliver, Inc., Stamford, Conn. Hydrocyclone size selection depends on the particle size characteristics of the respective feed streams.

The separated large granule wheat starch is then measured for weight average particle size, and if it is below about 20 microns, a refined yellow field pea starch (LPS) is blended with it in a sufficient amount to bring the weight average particle size up to about 20 microns minimum, as measured by a MODEL TA II Coulter Counter, available from Coulter Electronics, Inc., Hialeah, Fla. The particle size distribution is set forth below for this blended product:

| Particle Size | Percent by Weight |
| --- | --- |
| 20–32 microns | 45% minimum |
| 16–32 microns | 75% minimum |

The weight average particle size should be 20 microns mimimum.

The LPS starch is obtained from New Field Seeds, Ltd., Saskatoon, Saskatchewan, Canada, and is subjected to further processing as described in U.S. Pat. Nos. 3,996,060 and 3,996,061 mentioned above. Other large granule starches can be used instead of the LPS starch to increase the average particle size to an acceptable level. For example, arrowroot, faba bean and sago all have an average particle size large enough to be useful to increase the average particle size of the subject LWS starch to produce a LGP large granule starch product which has a large enough average particle size to be useful as a protective material on carbonless copy paper coatings.

The hydrocyclones 1, 2 and 3 are balanced by carefully adjusting the flow rates of the respective feed streams, and output streams of hydrocyclones. It has been found through experience that a recirculation feed stream (13 or 14) which does in fact not match the main feed stream 6 tends to cause the efficiency of the separation to change to the extent that the product gradually changes in its particle size distribution.

After the LGP starch product slurry has been thoroughly blended in the tank 9, it may be dewatered and dried, or it may be subjected to further treatment, for example, the crosslinking treatment described in U.S. Pat. No. 3,876,629. The crosslinking of the LGP starch product raises the pasting temperature of the LGP starch so that the granules remain intact as a protective material even when subjected to the elevated temperature of a high temperature coating process.

The separated starch fraction from the product underflow (LWS) should have at least:

38% by weight of 20–32 micron starch granules
70% by weight of 16–32 micron starch granules.

If below this level, the particle size distribution of the feed starch and the two recirculation feed streams should be checked and adjusted as necessary.

The above large granule wheat starch (LWS) is blended with large granule pea starch (LPS) at the ratio of about 65–75% by weight LWS starch to about 25–35% by weight LPS starch to obtain a 50% weight point of the LWS/LPS starch blend of about 20 microns, and the particle size distribution set forth above. The above product can be dewatered and dried and used as a protective material in carbonless copy paper. The product can also be subjected to a crosslinking reaction using a polyfunctional crosslinking agent such as phosphorus oxychloride, epichlorohydrin, urea formaldehyde, sodium trimetaphosphate and others.

The presently preferred crosslinking agent is phosphorus oxychloride, and the crosslinking reaction is carried out generally according to the method described in U.S. Pat. No. 3,876,629 issued to James A.

Lotzgesell. At the present time, aqueous slurries of the refined pea starch and the LWS wheat starch are first blended together, and the alkaline crosslinking reaction using phosphorus oxychloride is performed on the blended LGP starch. In the event that a large granule starch (such as arrowroot starch) is used to replace the LPS pea starch, it has a higher pasting temperature, so the crosslinking reaction is performed on LWS wheat starch prior to blending with the higher pasting temperature, large granule starch. It is also contemplated that both the LPS starch portion and the LWS starch portion of the product may be cross-linked separately and then blended, either while in aqueous slurry, or after drying. The aqueous slurry blending of the two starches prior to crosslinking is presently preferred. The blended, crosslinked product is thereafter dewatered and dried to produce a high temperature resistant product having a particle size distribution as set forth above.

In the event that only BWS starch is to be used to make a product meeting the above particle size distribution, it must be recognized that the operation of the hydrocyclones must be adjusted to obtain a large granule product (LGP) meeting the required size specifications. The flow rate must be adjusted, and the underflow/overflow ratio has to be changed, and these changes cause a decrease in dry yield percentage, compared to the blended LGP starch product. Whereas about 40% by weight of the BWS starch is utilized in the blended product, the yield of acceptable LGP starch product per given weight of BWS starch feed stream decreases to about 15-20% on a dry weight basis when no LPS starch is blended with the LWS starch.

Even though the respective feed streams and recirculated feed streams in the system are changed, the particle size distribution of the recirculated feed streams should be maintained the same, or nearly the same as the feed stream, to maintain most efficient operation of the system. The operation of the three series of hydrocyclones is balanced to attain this condition.

In a typical commercial operation, the method was operated successfully to obtain a blended product of LPS and LWS starch when the particle size distribution was as follows:

| Starch Stream | Ta II Coulter Count Data | |
| --- | --- | --- |
|  | Size | Percent By Weight |
| 1) feed stream BWS starch | 20-32 microns | 21.5% |
|  | 16-32 microns | 50.9% |
| 2) 3'rd pass underflow recirculation feed stream | 20-32 microns | 24.5% |
|  | 16-32 microns | 51.5% |
| 3) 2'nd pass overflow recirculation feed stream | 20-32 microns | 19.7% |
|  | 16-32 microns | 50.9% |

I claim:

1. An improved method for obtaining a large granule starch product from a native starch having a wide range particle size distribution, said starch being selected from the group consisting of wheat, barley or rye starches, the steps consisting essentially of:
   (a) preparing an initial aqueous feed starch slurry at no more than about 15° Bé from a granular starch having a particle size distribution in which at least about 20% by weight of the starch, dry solids basis, is 20-32 microns, about 50-55% by weight of the starch, dry solids basis, is 16-32 microns, and about 45-50% by weight of the starch, dry solids basis, is 2-16 microns;
   (b) feeding said initial aqueous feed starch slurry to a first hydrocyclone separator means to at least partially separate the granules into a first aqueous slurry at no more than about 22° Bé containing a higher percentage of larger size starch granules and a second aqueous slurry at no more than about 8° Bé containing a lower percentage of larger size starch granules;
   (c) feeding the first aqueous slurry of said first larger starch granules into a second hydrocyclone separator means after first diluting said slurry to a lower Baume to further separate the first aqueous slurry into a large granule starch stream at about 18°-22° Bé and a first recirculation stream at about 3°-5° Bé, said first recirculation stream having starch particle size distribution substantially the same as the initial aqueous feed slurry, said large granule starch stream having a particle size distribution in which at least about 38% by weight of the particles are in the size range of 20-32 microns, and at least about 70% by weight of the particles are in the size range of 16-32 microns;
   (d) carefully adding said first recirculation stream to the initial aqueous feed slurry being fed to said first hydrocyclone separator means;
   (e) supplying the second aqueous slurry from said first hydrocyclone separator means to a third hydrocyclone separator means to further separate said second aqueous slurry into a by-product stream and a second recirculation stream at no more than about 22° Bé, said second recirculation stream having a starch particle size distribution substantially the same as the initial aqueous feed slurry;
   (f) carefully adding said second recirculation stream to the initial aqueous feed slurry being fed to said first hydrocyclone; and
   (g) collecting a large granule starch stream from said second hydrocyclone separator means, said large granule starch stream including large granules obtained from said first and second recirculation streams and from the feed starch slurry, said large granule product having a particle size distribution in which at least 38% by weight of said granules are 20-32 microns, and at least 70% by weight of said granules are 16-32 microns.

2. The method of claim 1, including the step of:
   (h) adding a predetermined amount of a larger granule starch to the large granule starch separated from the native starch to further increase the percent by weight of larger granule starch.

3. The method of claim 2, in which the larger granule starch is selected from the group consisting of arrowroot, sago, fractionated potato, faba bean and yellow field pea starches.

4. The method of claim 2, in which the native starch is wheat starch, and the larger granule starch which is added thereto is pea starch.

5. In an improved method of obtaining a granular starch having a more uniform and limited particle size distribution from a parent starch, said parent starch including a granular portion having a particle size distribution in the range of 20-35 microns, the steps comprising:
   (a) feeding an aqueous suspension of a parent starch having a relatively wide range particle size distribution in which at least about 20% by weight of the starch, dry solids basis, is 20-32 microns, about 50-55% by weight of the starch, dry solids basis, is 16–32 microns, and about 45–50% by weight of the starch, dry solids basis, is 2–16 microns to a first hydrocyclone separator means to at least partially separate the particles by size into at least two first pass output streams, one of which has a somewhat more uniform and limited particle size distribution than the other first pass output stream;

(b) feeding one of said first pass output streams from said first hydrocyclone separator means to a second hydrocyclone separator means to further separate the first pass output stream into at least two second pass output streams, one of which has a particle size distribution in the range of 20–35 microns, and the other second pass output stream having a particle size distribution closely approximating the particle size distribution of the parent starch;

(c) feeding the other of said first pass output streams to a third hydrocyclone separator means to further separate the said first pass output stream into a least two third pass output streams, one of which has a particle size distribution closely approximating the particle size distribution of the parent starch; and (d) recirculating said first pass output stream and said third pass output stream which have particle size distributions closely approximating the particle size distribution of the parent starch back through the first hydrocyclone separator means to augment the recovery of a large granule starch having a particle size distribution in the range of 20–35 microns, whereby the yield thereof from a given amount of parent starch is improved.

6. The method of claim 5, in which the parent starch is selected from the group consisting of wheat, barley and rye.

7. The method of claim 6, in which the said output from the second hydrocyclone separator means includes about 45% by weight of particles in the size range of 20–32 microns, and about 75% by weight of particles in the size range of 16–32 microns after said output has been blended with a minor amount of a granular starch having a slightly larger particle size distribution, said granular starch being selected from the group consisting of legume starches, arrowroot, potato and sago starch.

8. The method of claim 6, in which the said output from the second hydrocyclone separator means includes about 38% by weight of starch particles in the size range of 20–32 microns, and about 70% by weight of the starch particles in the size range of 16–32 microns.

9. The method of claim 7, in which the legume starches include refined faba bean starch and refined yellow field pea starch, each having a preferred average particle size distribution of 20–35 microns.

* * * * *